US012353228B2

(12) United States Patent
Mathiesen et al.

(10) Patent No.: US 12,353,228 B2
(45) Date of Patent: Jul. 8, 2025

(54) FLOW CONTROL DEVICE AND METHOD

(71) Applicant: InflowControl AS, Porsgrunn (NO)

(72) Inventors: Vidar Mathiesen, Porsgrunn (NO); Haavard Aakre, Skien (NO); Bjørnar Werswick, Langesund (NO)

(73) Assignee: INFLOWCONTROL AS, Porsgrunn (NO)

( * ) Notice: Subject to any disclaimer, the term of this patent is extended or adjusted under 35 U.S.C. 154(b) by 189 days.

(21) Appl. No.: 18/037,213

(22) PCT Filed: Oct. 25, 2021

(86) PCT No.: PCT/EP2021/079503
§ 371 (c)(1),
(2) Date: May 16, 2023

(87) PCT Pub. No.: WO2022/106156
PCT Pub. Date: May 27, 2022

(65) Prior Publication Data
US 2024/0019878 A1   Jan. 18, 2024

(30) Foreign Application Priority Data
Nov. 17, 2020   (NO) .................................. 20201249

(51) Int. Cl.
*E21B 43/12*   (2006.01)
*F16K 31/126*   (2006.01)
*G05D 7/01*   (2006.01)

(52) U.S. Cl.
CPC ............ *G05D 7/0113* (2013.01); *E21B 43/12* (2013.01); *F16K 31/1266* (2013.01)

(58) Field of Classification Search
CPC ................................. E21B 34/08; E21B 43/12
See application file for complete search history.

(56) References Cited

U.S. PATENT DOCUMENTS 5,435,393 A   7/1995   Brekke et al.
7,819,196 B2   10/2010   Aakre
(Continued)

FOREIGN PATENT DOCUMENTS

WO   2008/004875 A1   1/2008
WO   2013/139601 A2   9/2013
(Continued)

OTHER PUBLICATIONS

International Search Report issued in PCT/EP2021/079503 on Mar. 1, 2022 (4 pages).
(Continued)

*Primary Examiner* — Kevin F Murphy
(74) *Attorney, Agent, or Firm* — Osha Bergman Watanabe & Burton LLP

(57) ABSTRACT

A fluid flow control device, which is for establishing a controllable fluid communication of a fluid flow between an external fluid reservoir and a base pipe of a production string, includes a primary flow path and a secondary flow path. The primary flow path is arranged inside a main housing. The primary flow path includes a primary flow path inlet configured to guide a primary fluid flow constituting a major portion of the fluid flow into the main housing during operation and a primary flow path outlet configured to guide the primary fluid flow from the main housing and into the base pipe during operation. The secondary flow path is configured to guide a secondary fluid flow constituting the remaining portion of the fluid flow. The secondary flow path includes a first fluid flow restrictor configured to generate a pressure decrease from a pressure $p_1$ upstream of the first fluid flow restrictor to a pressure $p_2$ downstream of the first fluid flow restrictor, a second fluid flow restrictor arranged downstream of the first fluid flow restrictor and configured to generate a pressure decrease from the pressure $p_2$ (Continued)

upstream of the second fluid flow restrictor to a pressure $p_3$ downstream of the second fluid flow restrictor and a chamber arranged downstream the first fluid flow restrictor and upstream the second fluid flow restrictor. A movable valve element is arranged inside the main housing and configured to close the primary flow path for fluid flow when exposed to a pressure force from within the chamber exceeding a threshold pressure force. The fluid flow control device further includes a top housing covering the primary flow path inlet of the main housing. The top housing includes a fluid flow inlet allowing the fluid flow to flow from the external fluid reservoir and at least partly into the primary flow path inlet, a swirl inducer inducing a swirl of the fluid flow between the fluid flow inlet and the primary flow path inlet, and a secondary flow path inlet configured to guide a secondary fluid flow into the secondary flow path.

15 Claims, 10 Drawing Sheets

(56) References Cited

U.S. PATENT DOCUMENTS

| | | | |
|---|---|---|---|
| 7,823,645 | B2 | 11/2010 | Henriksen et al. |
| 7,857,050 | B2 | 12/2010 | Zazovsky et al. |
| 7,918,275 | B2 | 4/2011 | Clem |
| 9,187,991 | B2 * | 11/2015 | Fripp ..................... E21B 43/12 |
| 9,556,706 | B1 | 1/2017 | Zhao |
| 9,683,429 | B2 * | 6/2017 | Mathiesen .......... F16K 31/1221 |
| 10,060,221 | B1 * | 8/2018 | Rong ..................... E21B 43/12 |
| 2008/0041580 | A1 | 2/2008 | Freyer et al. |
| 2008/0041582 | A1 | 2/2008 | Saetre et al. |
| 2009/0283275 | A1 | 11/2009 | Hammer |
| 2011/0067878 | A1 | 3/2011 | Aadnoy |
| 2011/0198097 | A1 | 8/2011 | Moen |
| 2011/0308806 | A9 | 12/2011 | Dykstra et al. |
| 2015/0021019 | A1 | 1/2015 | Veit |
| 2015/0034323 | A1 | 2/2015 | Greene et al. |
| 2017/0089172 | A1 | 3/2017 | Zhao |

FOREIGN PATENT DOCUMENTS

| | | |
|---|---|---|
| WO | 2019/175078 A1 | 9/2019 |
| WO | 2020/040847 A1 | 2/2020 |
| WO | 2020/046135 A1 | 3/2020 |

OTHER PUBLICATIONS

Written Opinion of the International Searching Authority issued in PCT/EP2021/079503 on Mar. 1, 2022 (11 pages).

Norwegian Search Report issued in NO 20201249 mailed on May 7, 2021 (2 pages).

Office Action issued in United Arab Emirates Application No. P6001173/2023; Dated May 13, 2025 (9 pages).

* cited by examiner

FLOW CONTROL DEVICE AND METHOD

FIELD OF THE INVENTION

The invention concerns the control of fluid flowing into a conduit. More specifically, the invention concerns a fluid flow control device, as well as a subsea production string and a method using such a fluid flow control device. The invention is useful in controlling flow of fluids from a subterranean hydrocarbon reservoir and into production strings and is particularly useful for autonomous handling of multiphase fluids during production.

BACKGROUND OF THE INVENTION

A well for producing hydrocarbons from a subterranean reservoir may extend through the reservoir in a number of orientations. Traditionally, reservoirs were accessed by drilling vertical wells. This is simple and straight-forward technique, but one which provides limited reservoir contact per well. Therefore, in order to access more of a reservoir per well, techniques and devices were developed to drill horizontal wells, i.e. turning the well from vertical to horizontal at a predetermined depth below the surface. So-called multi-lateral wells provide even greater access to—and contact with—the reservoir.

A major challenge in the production of hydrocarbons from subterranean reservoirs is to increase the ability to recover the oil that is present in the reservoir. Today, only a part of the oil in a given reservoir is actually recovered and produced before the field is shut down.

There are thus strong incentives for developing new technology to increase production and oil recovery.

Two factors are of particular importance in order to increase production and rate of recovery from a reservoir:
obtaining maximum reservoir contact and
preventing negative effects of gas and/or water penetration/breakthrough (commonly referred to as "coning").

The reservoir contact is commonly achieved by drilling a number of horizontal and/or multi-lateral wells. The negative effects of coning are commonly mitigated by so-called Inflow Control Devices (ICD) placed in the production string wall. Typically, a production string in a horizontal well comprises a large number of ICDs disposed at regular intervals along its entire length. The ICDs serve as inflow ports for the oil flowing from the reservoir (normally via the annulus between the production string and the well formation) and into the production string, and are ports having a fixed flow area.

So-called autonomous ICDs (AICDs) comprise one or more valve elements and are normally open when oil is flowing through the device, but chokes the flow when and where water and/or gas enters the device. The annulus between the production string and the casing/reservoir is typically divided into zones by annulus packers, which is known in the art. One or more ICDs or AICDs are then placed in each zone.

A number of ICDs are known in the art. Relevant examples of ICDs or AICDs are found in patent publications U.S. Pat. No. 5,435,393 (Brekke, et al.), U.S. Pat. No. 7,857,050 B2 (Zazovsky, et al.), U.S. Pat. No. 7,823,645 B2 (Henriksen, et al.), US 2008/0041580 A1 (Freyer, et al.), WO 2008/004875 A1 (Aakre, et al.), US 2011/0067878 A1 (Aadnoy), US 2008/0041582 A1 (Saetre, et al.), US 2011/0198097 A1 (Moen), US 2011/0308806 A9 (Dykstra, et al.), U.S. Pat. No. 7,918,275 B2 (Baker Hughes Inc), US 2009/0283275 A1 (Baker Hughes Inc) and U.S. Pat. No. 7,819,196 B2 (Norsk Hydro ASA).

The above-mentioned patent publications suffer from one or more of the following disadvantages:
The production is choked also for the oil, which may result in a significant loss of production (barrel/day) during the initial phase of the well's lifetime.
Undesired phases (gas/water) are neither choked nor closed at the moment of their breakthroughs.
Undesired phases (gas/water) are to a certain degree choked, though not to the extent of coming to a full, or close to full, halt in the inflow.
Reversible property is not exhibited, that is, the ability to autonomically reopen a valve that has been shut due to entrance of undesired phases at the moment when oil again starts to flow into the well.
Challenging to control the opening/closing.
High flow resistance within the main flow during throughput of desired phases.
Not able to manage harsh well conditions (high pressure and temperature, fouling, etc.) in a satisfactory way.

Prior art AICDs that overcome all of the above-mentioned disadvantages are disclosed in patent publication WO 2013/139601 A2 and WO 2019/175078 A1 (InflowControl), the contents of which are incorporated herein by reference.

Both prior art AICDs comprise a primary flow path and a secondary flow path, wherein the secondary flow path further comprises two fluid flow restrictors serving as an inflow port and an outflow port from a chamber, respectively. The two flow restrictors are configured to generate different fluid flow characteristics.

For the prior art AICD of WO 2013/139601 A2 the secondary flow path is arranged in fluid communication with the primary flow path, while the two flow paths are radially separated in the prior art AICD of WO 2019/175078 A1.

There are however some disadvantages with the AICDs disclosed in WO 2013/139601 A2 and WO 2019/175078 A1. During multi-phase flow there is often a mixture of undesired fluids such as gas and water and desired fluids such as oil. Without any additional measures, there is a risk that the above-mentioned prior art AICDs are closing at a later stage during such multi-phase flow, thereby causing an undesired production of the undesired fluids.

The purpose of the present invention is to overcome the shortcomings of the above-mentioned prior art and to obtain further advantages.

SUMMARY OF THE INVENTION

The invention is set forth and characterized in the main claims, while the dependent claims describe other characteristics of the invention.

In one aspect of the invention it is provided a fluid flow control device suitable for establishing a controllable fluid communication of a fluid flow F between an external fluid reservoir and a base pipe constituting part of a production string.

The fluid flow control device comprises a primary flow path, a movable valve element, a top housing and a secondary flow path. The primary flow path and the movable valve element is arranged inside a main housing.

The primary flow path comprises a primary flow path inlet configured to guide a primary fluid flow $F_0$ into the main housing during operation, preferably axially, or near axially, and a primary flow path outlet configured to guide the primary fluid flow $F_0$ from the main housing and into the base pipe during operation.

The secondary flow path comprises a secondary flow path inlet configured to guide a secondary fluid flow f through the secondary flow path. The secondary flow path establishes fluid communication between the fluid flow inlet, preferably the primary fluid flow inlet, and the base pipe during operation and comprises a first fluid flow restrictor configured to generate a pressure decrease from a pressure $p_1$ upstream of the first fluid flow restrictor to a pressure $p_2$ downstream of the first fluid flow restrictor. The secondary flow path further comprises a second fluid flow restrictor and a chamber B. The second fluid flow restrictor is arranged downstream of the first fluid flow restrictor and configured to generate a pressure decrease from the pressure $p_2$ upstream of the second fluid flow restrictor to a pressure $p_3$ downstream of the second fluid flow restrictor. The chamber B is arranged between the fluid flow restrictors, downstream the first fluid flow restrictor and upstream the second fluid flow restrictor. Note that the second fluid flow restrictor may also act as the control device's secondary flow path outlet in the form of an orifice. In this case, the pressure $p_3$ is the pressure in the base pipe during operation. Alternatively, the second fluid flow restrictor and the secondary flow path outlet may be separate structures within the main housing.

The movable valve element inside the main housing is configured to close the primary flow path for fluid flow F, or at least significantly choke the fluid flow F, when exposed to a pressure force from within the chamber B exceeding a threshold pressure force.

The top housing covers at least the primary flow path inlet of the main housing and comprises a fluid flow inlet allowing the fluid flow F (primary fluid flow $F_0$+secondary fluid flow f) to flow from the external fluid reservoir and at least partly into the primary flow path inlet, the above mentioned secondary flow path inlet and a swirl inducer inducing a swirl/rotation of the fluid flow F, between the fluid flow inlet and the primary flow path inlet.

The swirl inducer may preferably induce a swirl/rotation of the fluid flow F around and/or upstream the primary flow path inlet.

Note that 'cover' shall herein be interpreted as a top housing arranged above or on the main housing, wherein the radial cross-sectional area of the top housing extends at least the radial cross sectional area of the primary flow path inlet. Furthermore, this particular configuration of the top housing and the main housing must allow the fluid flow F to enter into the primary flow path inlet and the secondary flow path inlet.

More preferably, the swirl inducer is configured such that the rotational axis of the swirl is centered in the primary flow path inlet and oriented along the movement direction of the valve element. The portion of the fluid flow F entering the primary flow path inlet is reduced to F-f.

The swirl inducer may be arranged between the fluid flow inlet and the primary fluid flow inlet.

The secondary fluid flow inlet may be arranged at an axial height above the axial height of the primary fluid flow inlet. The axial and the radial directions are herein defined as the direction perpendicular and parallel to the longitudinal direction of the base pipe, respectively.

If the fluid flow F comprises a mixture of two or more phases having different fluid densities, for example gas and oil, the induced swirling between the fluid flow inlet and the primary/secondary flow path inlets forces the lower density phase (e.g. gas) to separate from the higher density phase (e.g. oil) due to the centripetal forces. By proper design of the top housing relative to the main housing, which includes positioning and dimensioning the fluid flow inlet, the primary flow path inlet and the secondary flow path inlet, it is possible to ensure that a larger portion of the separated lower density phase fluid (e.g. gas), for example all, or nearly all, is guided into the secondary flow path inlet and further through the flow restrictors.

For gas/oil mixture, the above described configuration thus favors the low-density phase fluid (i.e. gas) to enter the secondary flow path instead of high-density phase fluid (i.e. oil). This results in a higher pressure increase in chamber B at an early stage of such multiphase penetration, which again results in a desired early closing or choking of the primary fluid flow. Production of low-density phase fluid (gas) is thereby minimized.

For oil/water flow, the above described configuration again favors the low-density phase fluid (i.e oil) to enter the secondary flow path instead of high-density phase fluid (i.e. water). But contrary to the gas/oil mixture scenario, the oil/water flow results in a lower pressure in chamber B at an early stage of the multiphase penetration, which again results in a desired late closing or choking of the primary fluid flow, thereby allowing the primary flow path to remain open for producing the oil/water mixture at a higher water cut.

Consequently, if water is carrying oil with it, the primary flow path stays open longer, and if water is carrying no or little oil, the primary flow path starts choking.

In a reservoir containing a large amount of water, any residual oil does not separate effectively from the water. The difference in density is too low. Hence, water flowing in the reservoir towards the production well typically carry oil droplets due to relatively low buoyancy and relatively high total drag force.

This is not the situation for gas/oil flow having a significantly higher density difference than water/oil-mixture. The buoyancy is thus higher, and the drag is correspondingly low. When gas and oil are flowing to the base pipe, the main drive mechanism for oil is gravity. During gas breakthrough into the base pipe, a gas cone is typically formed. When the gas flow is stopped, gravity forces will force the oil to flow through this cone and into the base pipe.

Thus, in contrast to the water/oil flow, when gas is choked or stopped, the oil flows independently of the gas rate.

For at least this reason, it is advantageous to ensure that the primary flow path inlet remains open for a longer period in water/oil flow.

In a typical scenario, the liquid is thrown towards the axial walls within the top housing and further into the primary flow path inlet while the gas ooze into the secondary flow path inlet.

In an alternative configuration, the secondary flow path inlet may be situated downstream of the primary flow path inlet. In this case, all of the fluid flow F is guided into the primary flow path inlet after which the fluid flow F is divided according to phase into the secondary flow path or further through the primary flow path.

In an exemplary configuration of the invention, the top housing further comprises at least a part of the secondary flow path arranged in fluid communication with the secondary flow path inlet.

In another exemplary configuration, the secondary flow path inlet may be located into a part of the top housing facing towards the primary flow path inlet.

In yet another exemplary configuration, the secondary flow path inlet may be configured such that the secondary fluid flow f (constituting a minor fraction of the fluid flow F) is, during operation, flowing into the secondary flow path inlet with a direction opposite of the direction of the primary fluid flow $F_0$ (constituting a major fraction of the fluid flow F).

In yet another exemplary configuration of the invention, the swirl inducer comprises a plurality of fluid flow deflectors mutually spaced apart to form at least one swirl inducing channel having a deflection angle ($\alpha$) relative to a radial direction of the fluid flow control device, thereby setting the direction of the swirl of the fluid flow F. The radial direction is in this configuration defined as the direction perpendicular to the mean direction of the primary fluid flow when entering the primary flow path inlet. See also the earlier described definition in respect of the base pipe. Each of these pluralities of fluid flow deflectors may have a wedge shape with two of its tapering sides (which preferably comprises axially directed walls) oriented in the direction of the swirl, i.e. with its apex distal from the fluid flow inlet.

In yet another exemplary configuration of the invention, the top housing is divided into a first radial part and a second radial part, wherein the first radial part comprises the fluid flow inlet and the swirl inducer and the second radial part comprises the secondary flow path inlet and at least part of the secondary flow path which is in fluid communication with the secondary flow path inlet. The second radial part may in this configuration further cover at least a part, more preferably the whole, of the primary flow path inlet. Moreover, the second radial part may be axially thicker relative to the first radial part and the at least part of the secondary flow path may be oriented in the radial direction at an axial height equal to or above an axial height of the fluid flow inlet measured in respect of a center point of the inlet. Note that the top housing is herein defined as above the main housing. The radial boundary between the first radial part and the second radial part may further comprise axial walls having a deflection angle $\alpha$ relative to the radial direction of the fluid flow control device, thereby setting the direction of the swirl of the fluid flow F. As described for the other configuration described above, the radial direction is defined as the direction perpendicular to the mean direction of the primary fluid flow when entering the primary flow path inlet.

In yet another exemplary configuration of the invention, a major portion of the length of the secondary flow path, i.e. more than 50%, extends outside the main housing.

In a second aspect, the invention concerns a production string for transport of hydrocarbons. The production string comprises a base pipe, an enclosure arranged at the exterior wall of the base pipe having at least one enclosure input opening and a fluid flow control device as described above. The fluid flow control device is arranged into a through-going hole of the wall of the base pipe within the enclosure such that a controllable fluid communication is obtained between the enclosure and the interior of the base pipe. The enclosure is configured to provide an input chamber covering the at least one enclosure input opening of the enclosure and the fluid flow inlet of the fluid flow control device.

In a third aspect, the invention concerns a method of controlling fluid flow F based on changes in fluid properties using a fluid flow control device as described above.

When the fluid flow control device is in an open position, the method comprises the following steps:
  guiding the fluid flow F into the fluid flow inlet,
  guiding the fluid flow through the swirl inducer arranged between the fluid flow inlet and the primary flow path inlet to generate a swirl of the fluid flow F around the primary flow path inlet,
  guiding the primary fluid flow $F_0$ constituting a major portion of the fluid flow F through the primary flow path inlet within the fluid control device housing while the fluid flow F is swirling; and
  guiding the secondary fluid flow f through the secondary flow path, the secondary fluid flow f constituting a minor portion of the fluid flow F.

The major portion of the fluid flow through the primary flow path inlet and the minor portion of the fluid through the secondary flow path may be achieved by making the entrance opening of the secondary flow path inlet smaller than the entrance opening of the primary flow path inlet.

BRIEF DESCRIPTION OF THE DRAWINGS

These and other characteristics of the invention will be clear from the following description of embodiments, given as non-restrictive examples, with reference to the attached sectional sketches and drawings wherein.

DETAILED DESCRIPTION OF EMBODIMENTS

Figure 1:
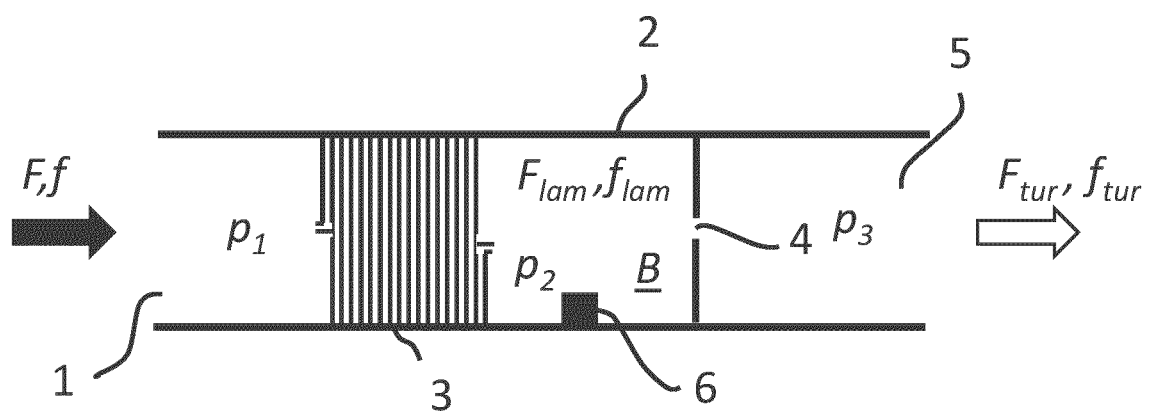
FIG. 1 shows the principle behind the invention.

FIG. 1 illustrates how a fluid F, f flows through a primary fluid flow inlet 1 into a conduit 2 at a first pressure $p_1$, further through a first fluid flow restrictor 3 and into a chamber B where it attains a second pressure $p_2$, and then flows through a second fluid flow restrictor 4 before it exits the conduit 2 through a fluid flow outlet 5 at a third pressure $p_3$. When the fluid flow rate and fluid properties (e.g. viscosity, density) are kept constant, the pressures $p_1$, $p_2$, $p_3$) are also constant, and $p_1 > p_2 > p_3$.

In FIG. 1, the first fluid flow restrictor 3 is a coiled pipe and the second fluid flow restrictor 4 is an orifice. The coiled pipe may have any cross-sectional shape such as circular shape, rectangular shape, triangular shape, etc.

In general, the pressure loss due to viscous effect in a cylindrical pipe of length L and uniform diameter D is proportional to length L and can be characterized by the Darcy-Weisbach equation expressed as:

$$\Delta P = \frac{f_D \cdot \rho \cdot \langle v \rangle^2}{2} \frac{L}{D_L} \quad \text{(Equation 1)}$$

where: ρ=the density of the fluid flow rate (kg/m³)
$D_L$=the hydraulic diameter of the pipe (for a pipe of circular section, this equals the internal diameter of the pipe (m));
$\langle v \rangle$=the mean flow velocity, experimentally measured as the volumetric flow rate Q per unit cross-sectional wetted area (m/s);
$f_D$=the Darcy friction factor (also called flow coefficient λ);
L=the length of the cylindrical pipe (m).

Figure 2:
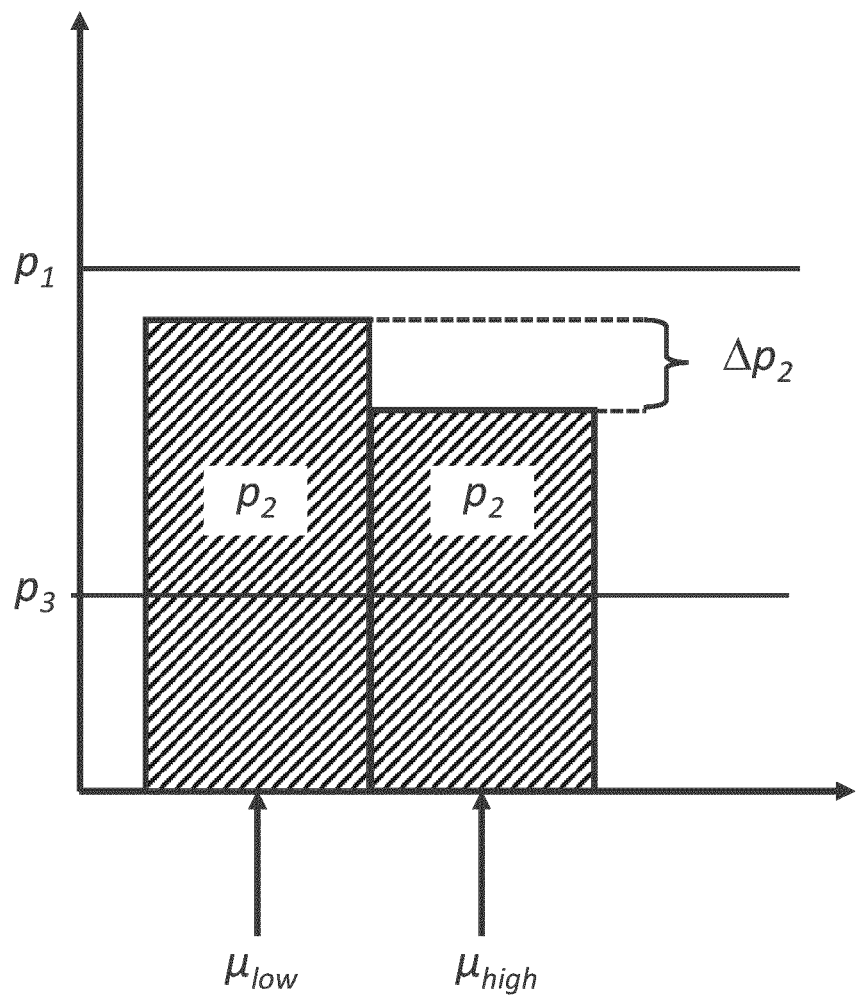
FIG. 2 shows the correlation between change in pressure inside the chamber (i.e. between fluid flow restrictors), and change in fluid viscosity.

Hence, according to the Darcy-Weisbach equation (Equation 1) a large ratio L D corresponds to a large pressure drop ΔP (from $p_1$ to $p_2$ in FIG. 2) when a fluid F, f is flowing through the conduit 2.

In the laminar regime, Equation 1 may be rewritten as $$\Delta P = \frac{128 \cdot Q}{\pi} \cdot \mu \cdot \frac{L}{D^4} \quad \text{(Equation 2)}$$

Thus, under laminar flow conditions or near laminar flow conditions, the change in pressure ΔP across the coiled pipe is seen to be proportional to the fluid viscosity μ, as well as the ratio $L/D^4$.

Laminar flow is achieved with a Reynolds number RE being less than 4000. Since RE=$\langle v \rangle \cdot D \cdot \rho/\mu$ for flow of fluid in a pipe of diameter D, such laminar flow may be ensured by adjusting e.g. the diameter D and/or the flow velocity $\langle v \rangle$. From equation 2 it is clear that if ΔP is constant, Q (volumetric flow rate) would decrease with increasing pipe length L, and as a result also a decrease in velocity $\langle v \rangle$. A coiled pipe with a sufficient pipe length L would therefore have formed a laminar flow or near laminar flow.

The flow characteristics in a fluid flowing through an orifice may be expressed as:

$$\Delta P = K_{orifice} \frac{\rho \cdot v^2}{2} \quad \text{(Equation 3)}$$

where: ΔP=differential fluid pressure across the orifice (typical unit: Pa)
$K_{orifice}$=orifice-specific coefficient (dimensionless)
ρ=fluid density (unit of mass per unit of volume)
v=fluid velocity (units of length per unit time)

Thus, when flowing through the orifice 4, the fluid experiences a pressure drop ΔP (from $p_2$ to $p_3$) described by equation 3. The change in fluid pressure across the orifice 4 is almost independent of viscosity, but proportional to the density and the orifice coefficient, as well as to the fluid velocity squared.

Therefore, with reference to FIG. 1, the fluid pressure $p_2$ in the chamber B, i.e. between the coiled pipe 3 and the orifice 4, will change if the properties (viscosity or density) of the fluid changes. This is illustrated graphically in FIG. 2. A first (low) value for $p_2$ is formed with a flow of fluid having a high fluid viscosity $\mu_{high}$ and a second (high) value for $p_2$ is formed with a flow of fluid having a low fluid viscosity $\mu_{low}$. The difference between the values for $p_2$, i.e. $\Delta P_2$, occurring when the fluid properties changes (e.g. a decrease in viscosity) may be used to perform work, for example actuate an actuator 6 (such as exerting pressure on an actuating surface), which in turn may move a piston 9 acting as a valve element 9, possibly via hydraulic and/or electrical and/or mechanical transmission means 10 (see FIG. 3).

In general, the present invention utilizes the change in pressure $\Delta P_2$ that occurs between two different flow restrictors when subjected to fluids of different properties, e.g. oil and water. These properties may for example be viscosity, density or both.

Figure 3A:
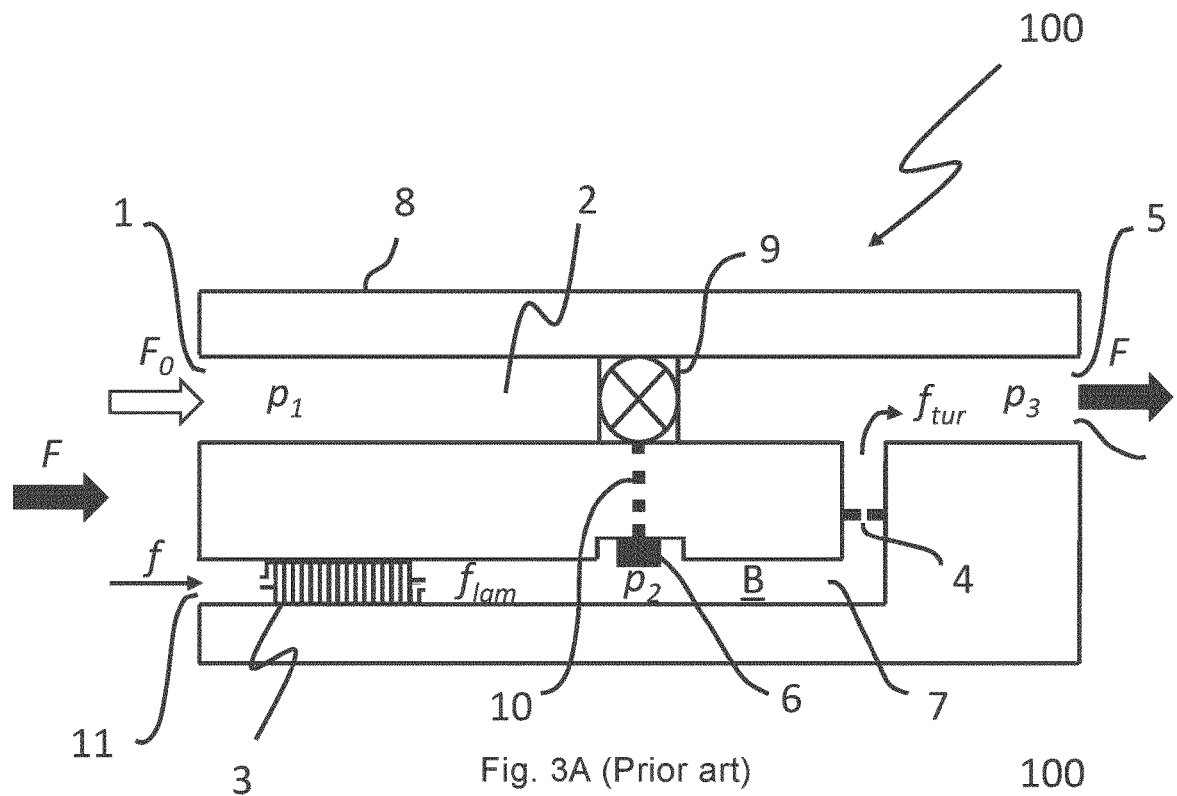
FIGS. 3 A and B show schematically two different embodiments of the invention, where FIG. 3 A has a single fluid flow output and FIG. 3 B has two fluid flow outputs; one for the primary fluid flow $F_0$ and the other for the secondary fluid flow f.
Figure 3B:
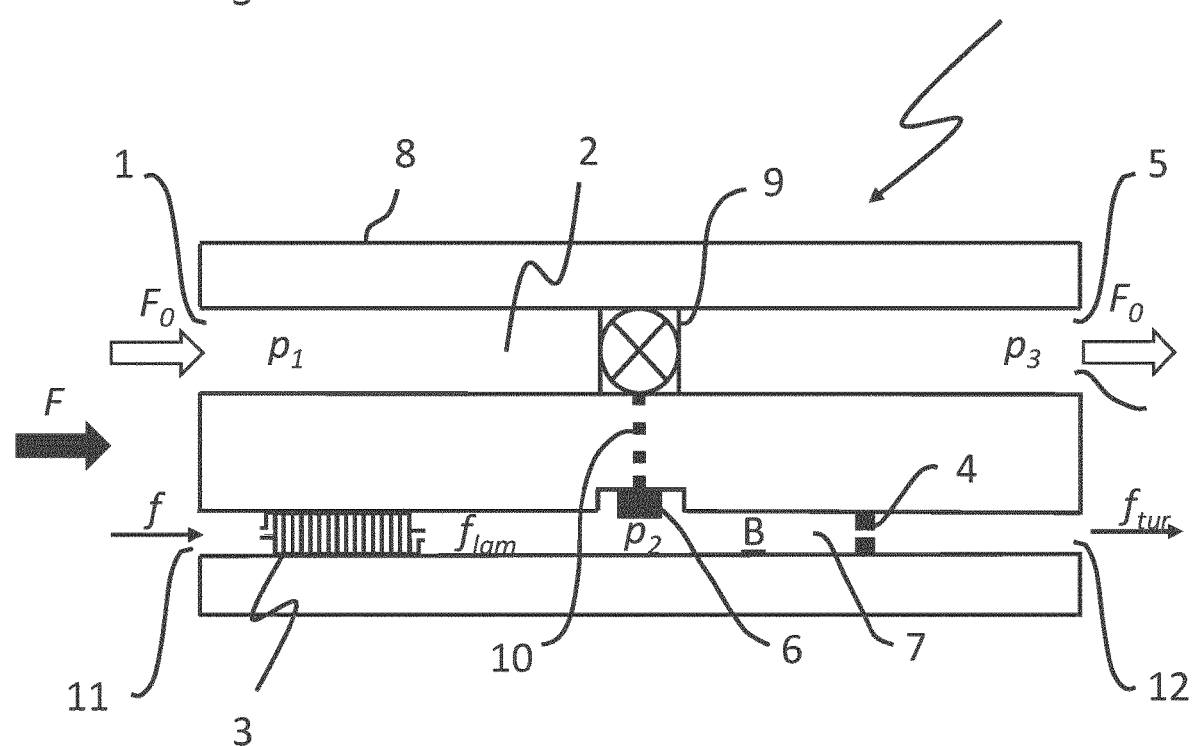

FIGS. 3A and 3B are schematics illustrating two configurations of the principle described above. FIG. 3A illustrates a first configuration of the flow control device 100 in its basic form (i.e. where seals, gaskets and other required or recommended ancillary parts known in the art are omitted). A fluid flow F enters a main housing 8 via two fluid paths 2,7; a primary flow path (primary conduit) 2 having a primary flow path inlet 1 and a secondary flow path (secondary conduit) 7 having a secondary flow path inlet 11. The major portion $F_0$ of the fluid flow F (i.e. more than 50%), hereinafter referred to as the primary fluid flow, flows through the primary conduit 2 and an initially open valve element 9. A smaller portion f of the fluid flow F, for example 5% of the primary fluid flow $F_0$, also referred to as the secondary fluid flow f, flows through the secondary conduit 7 which includes a first fluid flow restrictor 3 in the form of a coiled, thin tube of length L and diameter D and a second fluid flow restrictor 4 in the form of an orifice, before it enters the primary conduit 2 and exits out of this conduit 2 via a fluid flow outlet 5.

When the viscosity μ of the fluid flow F changes, the second pressure $p_2$ in a chamber B located in the secondary conduit 7 between the two fluid restrictors 3,4 also changes. For example, if a flow of oil is replaced by water or gas, the viscosity decreases and the second pressure $p_2$ increases as explained above with reference to FIGS. 1 and 2.

FIG. 3A furthermore shows schematically an actuator 6 arranged within, or coupled to, the chamber B. The actuator 6 is connected via transmission means 10 (e.g. via a hydraulic linkage, a mechanical linkage and/or a signal cable) to the piston/valve element 9. The actuator 6 can be of any form that enable actuation of the piston/valve element 9, e.g. the surface of a valve piston 9 being exposed to the force generated by the induced pressure $\Delta P_2$ such as the surface of a movable disc 9 facing the chamber B at one side and the primary flow path inlet at the opposite side.

When the fluid viscosity μ changes as described above, the difference in values for $p_2$ ($\Delta P_2$, see FIG. 1) imparts an actuating force on the actuator 6, which in turn operates the piston/valve element 9 (for example by closing/choking the primary flow path inlet 1). Thus, the conduits 2,7 and the fluid flow restrictors 3,4 may be configured and dimensioned such that (when breakthrough is to be prevented) the piston/valve element 9 automatically closes the flow of fluid F when the viscosity μ of the fluid F drops below a predetermined level. As an example, in an oilfield application, this flow control device 100 prevents unwanted water and/or gas inflow into a production string 101 (see FIG. 4).

FIG. 3B shows schematically a second configuration of the flow control device 100. The second configuration is identical to the first configuration with the exception that the secondary flow path 7 is not in fluid communication with the primary flow path 2. Instead, both enters and exits the housing 8 via separate flow paths. The primary fluid flow $F_0$ enters the primary flow path 2 from the primary flow path inlet 1 and exits through primary flow path outlet 5, while the secondary fluid flow f enters the secondary flow path 7 from inlet 11 and exits through a separate secondary flow path outlet 12. The operational principle is however the same as for the first configuration, i.e. to create a pressure difference $\Delta P_2$ between two fluid flow restrictors 3,4 arranged at least partly within the secondary flow path 7 and to use the force created by this induced pressure difference $\Delta P_2$ to close the primary fluid flow $F_0$ flowing through the primary flow path 2 by the aid of a piston/valve element 9.

Figure 4:
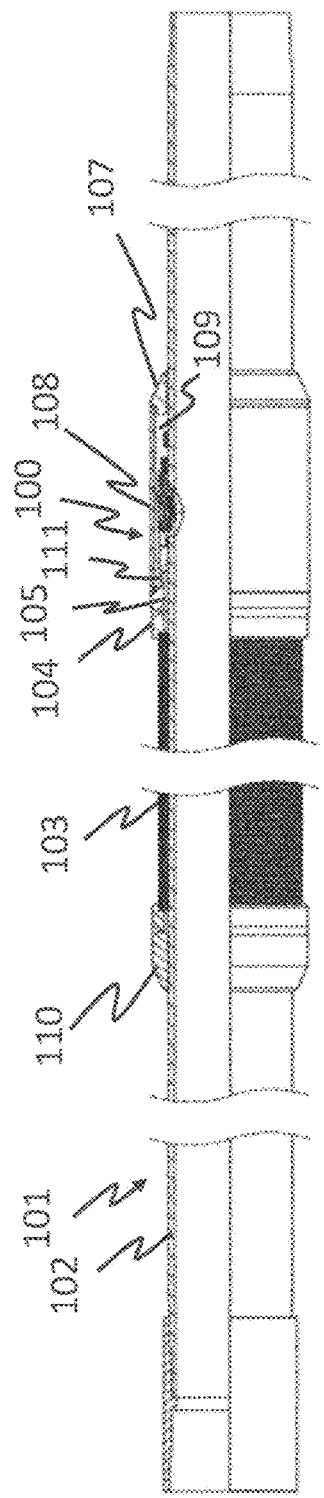
FIG. 4 shows a flow control device in accordance with the invention, installed in a production string.

FIG. 4 shows a cross sectional drawing of a complete flow control device 100 in accordance with the invention, mounted into a production string 101.

In addition to the flow control device 100, the production string 101 further comprises a base pipe 102 into which the flow control device 100 is installed, a sand screen 103 surrounding the base pipe 102 in order to prevent large solid particles such as grains of sand or debris to enter the base pipe 102, an outer sleeve 110 fixing one axial end of the sand screen 103 to the base pipe 102, a first inner sleeve 104 configured to fix both the other axial end of the sand screen 103 onto the base pipe 102 and to establish an inner sleeve fluid channel 105 from a sand screen fluid channel oriented through or below the sand screen 103 and to the primary and secondary fluid path inputs 1,11 of the flow control device 100.

The production string 101 further comprises a second inner sleeve 107 arranged on the base pipe 102 at the opposite radial side of the flow control device 100 relative to the first inner sleeve 104 and an end cap 108 sealing, or near sealing, the installed flow control device 100 from the exterior of the production string 101, thereby creating a closed input chamber 109 set up by the first and second inner sleeves 104,107, the end cap 108 and the base pipe 102.

In operation, fluid is flowing through the sand screen 103 into the sand screen fluid channel, further along the inner sleeve fluid channel 105, into the closed input chamber 109 via an inner sleeve opening 111 and finally through the flow control device 100 into the base pipe 102.

As is apparent from FIG. 4, the space available for the flow control device 100 in a typical production string 101 is small. It is considered advantageous that the main housing 8 of the flow control device 100 has an axial thickness $t_{AICD}$ (i.e. the thickness perpendicular to the axial/longitudinal direction of the base pipe 102 when installed) that is as small as technically feasible in order to avoid or minimize protrusion from the external walls of the base pipe 102 and/or into the interior of the base pipe 102.

Protrusion into the base pipe 102 should in particular be avoided since this could interfere with measurements and/or maintenance and/or repair work within the base pipe 102 that may be required/recommended throughout the operational lifetime of the production string 101. Such operations often involve insertions of various equipment into the base pipe 102.

Figure 5:
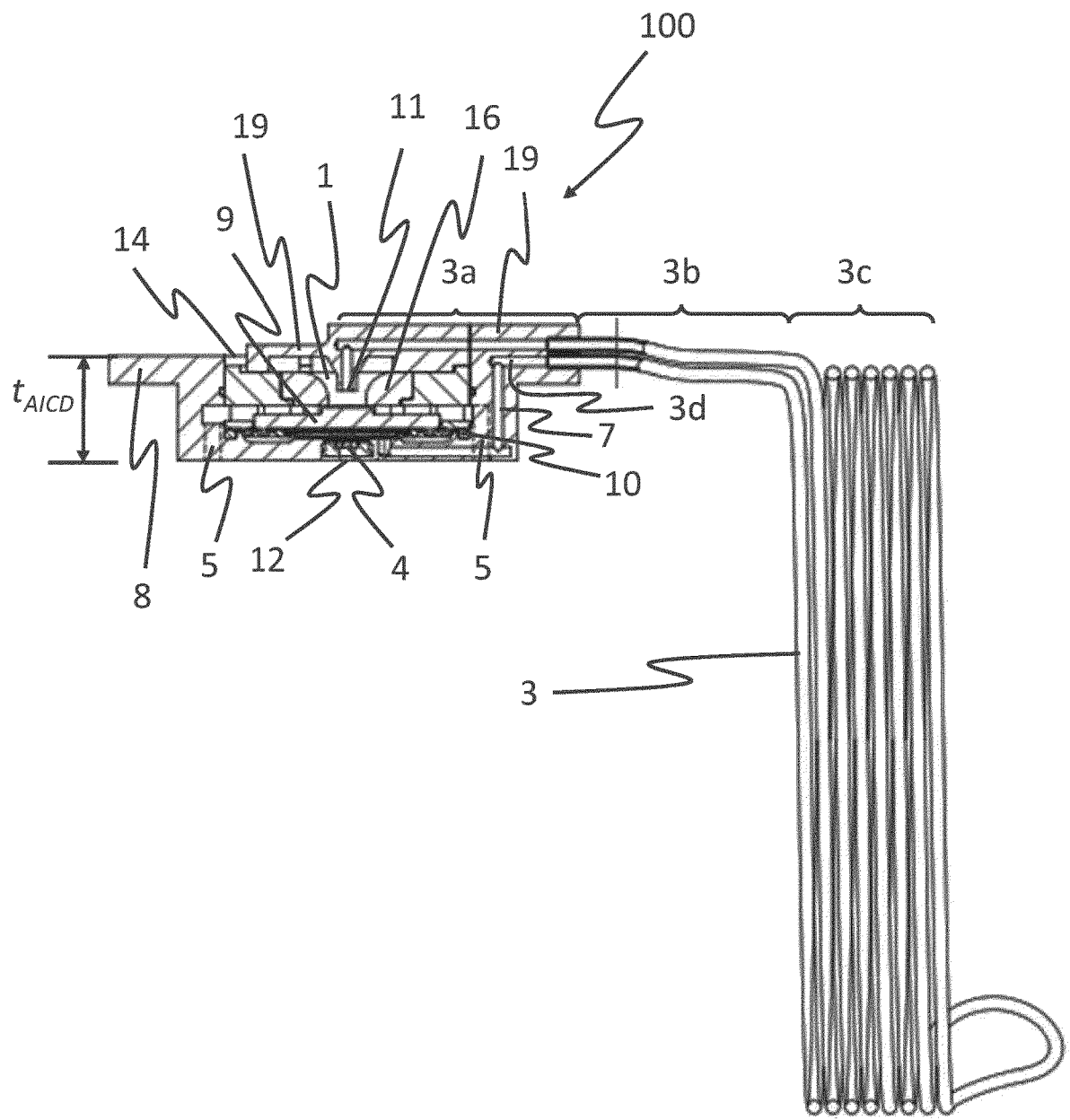
FIG. 5 shows a flow control device of the invention, illustrating the length of the coiled pipe acting as a fluid flow restrictor relative to the size of the main housing of the flow control device.

As explained above, to ensure a large pressure difference across the first fluid flow restrictor 3 the ratio $L/D^4$ should be large. Further, laminar flow may be obtained by generating a flow having a Reynold number less than 4000, preferably less than 2500. This can be achieved by making the length L of the pipe constituting the first fluid flow restrictor 3 sufficiently large FIG. 5 shows a configuration where the flow control device 100 comprises a coiled pipe acting as a laminar flow generating first fluid flow restrictor 3 arranged within the secondary conduit 7. To ensure laminar flow $f_{lam}$ of the secondary fluid flow f flowing through the secondary conduit 7, and with large pressure difference $p_1-p_2$, the coiled pipe 3 is made significantly longer than the axial thickness $t_{AICD}$ of the main housing 8.

The first fluid flow restrictor 3 may be divided into an interior part 3a located inside the main housing 8, an exterior straight part 3b located outside the main housing 8 and in fluid communication with the interior part 3a and an exterior coiled part 3c located outside the main housing 8 and in fluid communication with the exterior straight part 3b. The exterior coiled part 3c is preferably coiled around the base pipe 102 a multiple time to minimize the required spatial use in the longitudinal direction of the base pipe 102, thereby minimizing the size interference of the inventive flow control device 100 with the existing production lines 101. At the same time, desired large pressure differences and laminar flow may be achieved.

The ratio between the length L of the pipe and the axial thickness $t_{AICD}$ of the main housing 8 is preferably higher than 50, more preferably higher than 100, even more preferably higher than 200, even more preferably higher than 300. In a typical installation, the length L of the pipe is 5 meters and the axial thickness $t_{AICD}$ is 14 millimeters.

Figure 6:
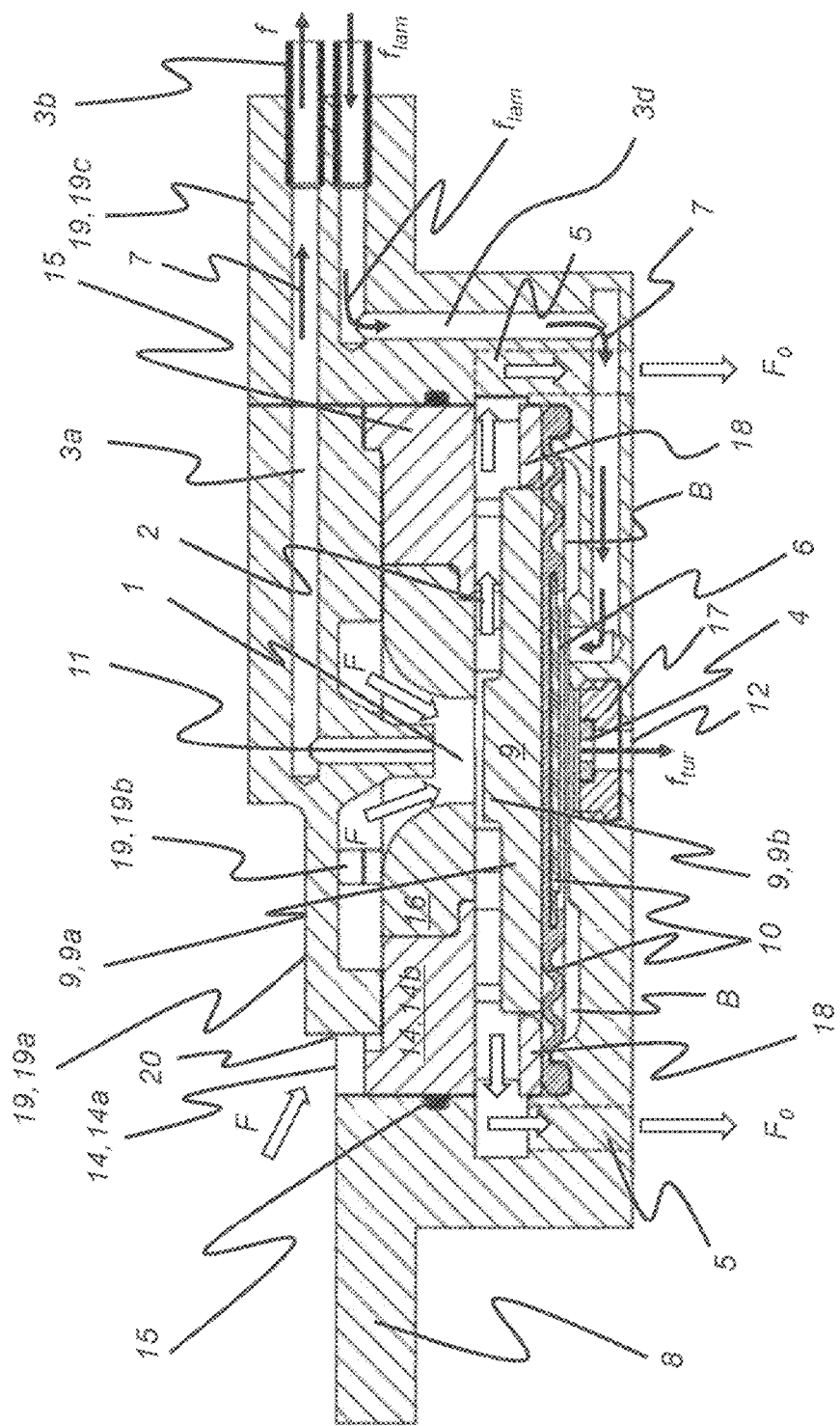
FIG. 6 shows in greater detail the main housing of the flow control device of FIG. 5.

FIG. 6 shows a section of the flow control device 100 which includes only the parts situated within or near the main housing 8. The main housing 8, which in operation is arranged within the wall of the base pipe 102 as exemplified in FIG. 4, displays primary and secondary inlets 1,11 in fluid communication with the closed chamber 109 via a fluid flow inlet 20 and fluid flow outlets 5,12 in fluid communication with the inside of the base pipe 102 of the production string 101.

The valve element 9, which in FIGS. 5-9 is shown in the form of an axially movable piston/disc 9, is arranged inside the main housing 8. The valve element 9 is placed within a teethed primary fluid flow bushing 18, the latter providing lateral support to the piston 9 (see FIG. 7) while allowing unrestricted axial piston movements. Lateral support signifies no or little possibility of movements of the piston 9 in the radial direction, i.e. parallel to the longitudinal axis of the base pipe 102 at the installation point.

Furthermore, the surface of the piston/valve element/movable disc 9 facing away from the primary and secondary flow path inlets 1,11 is in the configuration shown in FIG. 6 contacting a resilient member 10 fixed at its outer circumference to the adjacent inside wall(s) of the main housing 8. The resilient member 10 transmits induced pressure force to the piston 9 and ensures that the flow control device 100 is in an initial predetermined position prior to any fluid flow F, for example in a fully open position or a fully closed position. The resilient member 10, for example a diaphragm, may be made of a semi-flexible material such as an elastomer.

Figure 7:
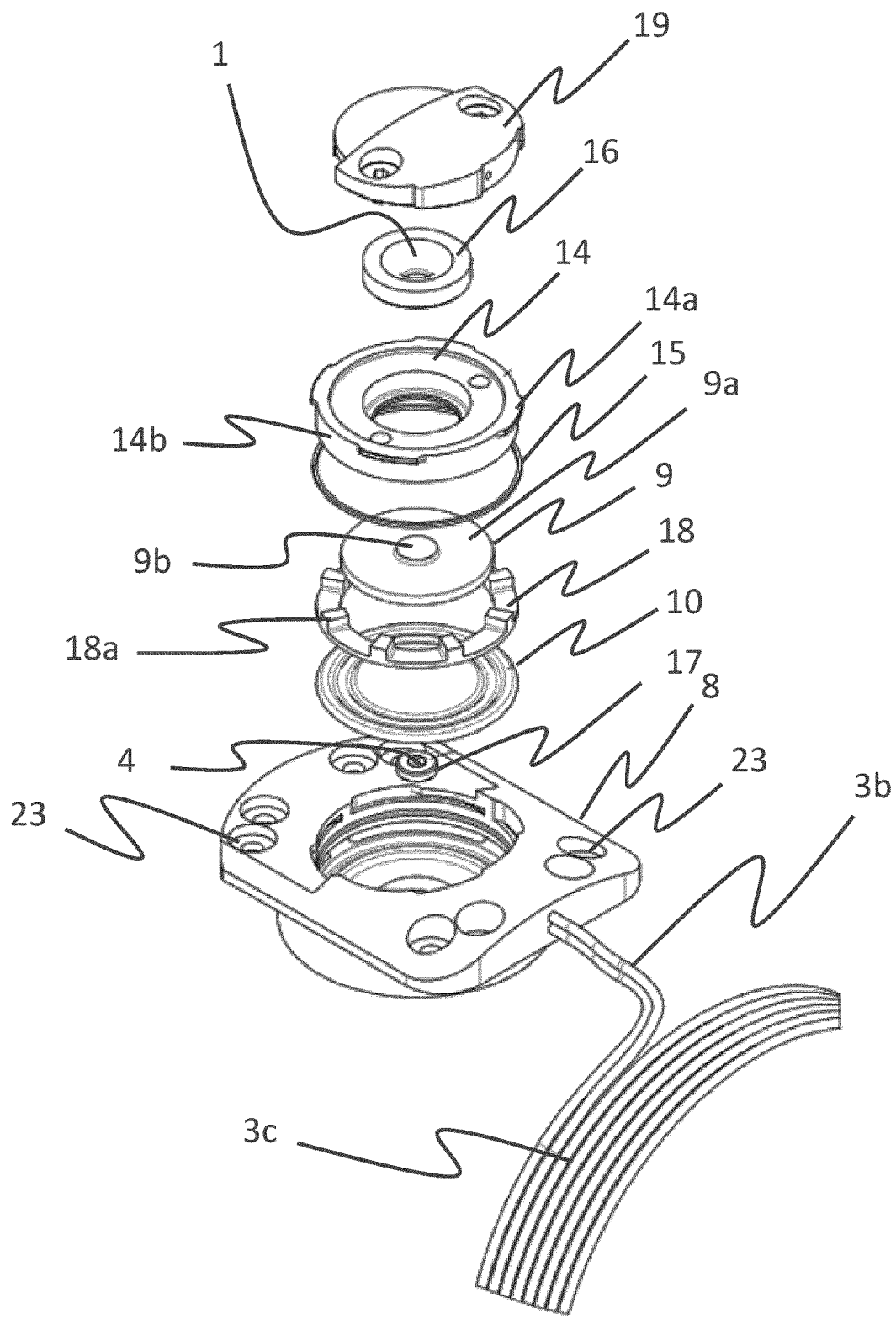
FIG. 7 shows a flow control device of the invention in an exploded view.

With particular reference to FIG. 7, and in conjunction with FIG. 6, the bushing teeth 18a arranged at the outer circumference of the primary fluid flow bushing 18 are seen to act both as axial spacers between the resilient member 10 below the piston 9 (i.a. near the inside of the base pipe 102) and an inlet bushing 16 forming the primary flow path inlet 1 above the piston 9 (i.a. near the outside of the base pipe 102). Further, the bushing 18 comprises a corresponding number of channel openings 18b between the teeth 18a to allow the primary fluid flow $F_0$ to flow radially therethrough.

As best seen in FIG. 7, the piston 9 comprises a lower disc 9a contacting the resilient member 10 and an upper disc 9b centrally arranged on the lower disc 9a. The outer radial diameter of the lower disc 9a is equal to, or near equal to, the inner diameter of the teethed primary fluid flow bushing 18. The upper disc 9b is arranged/formed centrally on the lower disc 9a and has a radial diameter which is less than the radial diameter of the lower disc 9a, for example equal or slightly larger than the smallest inner diameter of the primary flow path inlet 1 and/or equal or less than half the diameter of the lower disc 9a. Note however, that the top face of the piston 9 is not limited to a disc geometry. Any geometry of the piston 9 allowing opening/closing of the primary flow path inlet 1 may be envisaged.

An example of a slightly larger diameter of the upper part of the piston 9 may be a diameter less than 10% larger than the smallest inner diameter of the primary flow path inlet 1.

The primary flow path inlet 1 is in FIG. 6 shown formed in a separate inlet bushing 16. The inlet bushing 16 comprises a funnel shaped inlet opening with smoothed inner wall(s), thereby ensuring a minimum of turbulence during operation. Herein, a smoothed inner wall signifies a wall void of sharp edges and/or pointed protrusions.

To lock the piston/valve element 9, the primary fluid flow bushing 18 and the resilient member 10 within the main housing 8, a locking ring 14 is arranged above the piston 9 with its center around the inlet bushing 16. The locking mechanism is achieved by and upper part 14a having locking protrusions/teeth inserted into corresponding tracks and/or meshing with corresponding protrusions within the inner opening of the main housing 8. A lower part 14b of the locking ring 14 forms a tight fit with the inner diameter of the main housing 8. Further, sealing means 15 such as an O-ring is arranged radially between the lower part 14b and the main housing 8 to avoid fluid leakage there between. However, such a locking ring 14 may be fixed to the main housing 8 in other ways than with locking protrusions 14a. For example may configurations with external threads and/or retaining rings be envisaged.

Note that the inlet bushing 16 and the locking ring 14 may in another exemplary configuration be made in one solid part. The above described configuration with two separate parts 14,16 has however the advantage that that a hard material (e.g. cemented tungsten carbide) may be selected for the inlet bushing 16 to prevent erosion near the primary flow path inlet 1 due to high velocity and/or sudden change in flow direction.

With reference to FIGS. 5-8, the flow control device 100 also comprises a top housing 19 arranged onto the main housing 8 such that the inlet bushing 16 with the primary flow path inlet 1 is covered. The top housing 19 is designed such that an entrance volume is formed between the top housing 19 and the main housing 8, in which the primary flow path inlet 1 is situated at a lower side of the volume and the secondary flow path inlet 11 is situated at an upper side of the volume at the same radial position of the primary flow path inlet 1.

The configuration of the top housing 19 seen in FIGS. 5-8 may be divided into two parts 19a,19c;
- a first part 19a comprising a fluid flow inlet 20 for allowing fluid flow F to enter the entrance volume and swirl inducing means 19b and
- a second, thicker part 19c comprising at least a length of the interior part 3 of the coiled pipe 3.

The top housing 19 may be fixed to the locking ring 14 by screws 19d.

As best seen in FIGS. 6 and 7, the interior part 3a of the coiled pipe 3 extends partly within the second part 19c of the top housing 19 and partly within the main housing 8.

The swirl inducing means 19b are configured to induce a swirling motion on the fluid flow F when entering the entrance volume. This may be accomplished by a wedged structure 19b as seen from above in the cross-sectional drawing of FIG. 9B. The plurality of wedges forming the wedge structure 19b sets up deflection channels with a common deflection angle α relative to the radial orientation from the center axis of the primary flow path inlet 1. Hence, the value of the deflection angle α sets the swirling radius, which again affects the degree of separation of the various phases in a multiphase fluid flow F entering through the fluid flow inlet 20.

Figure 9A:
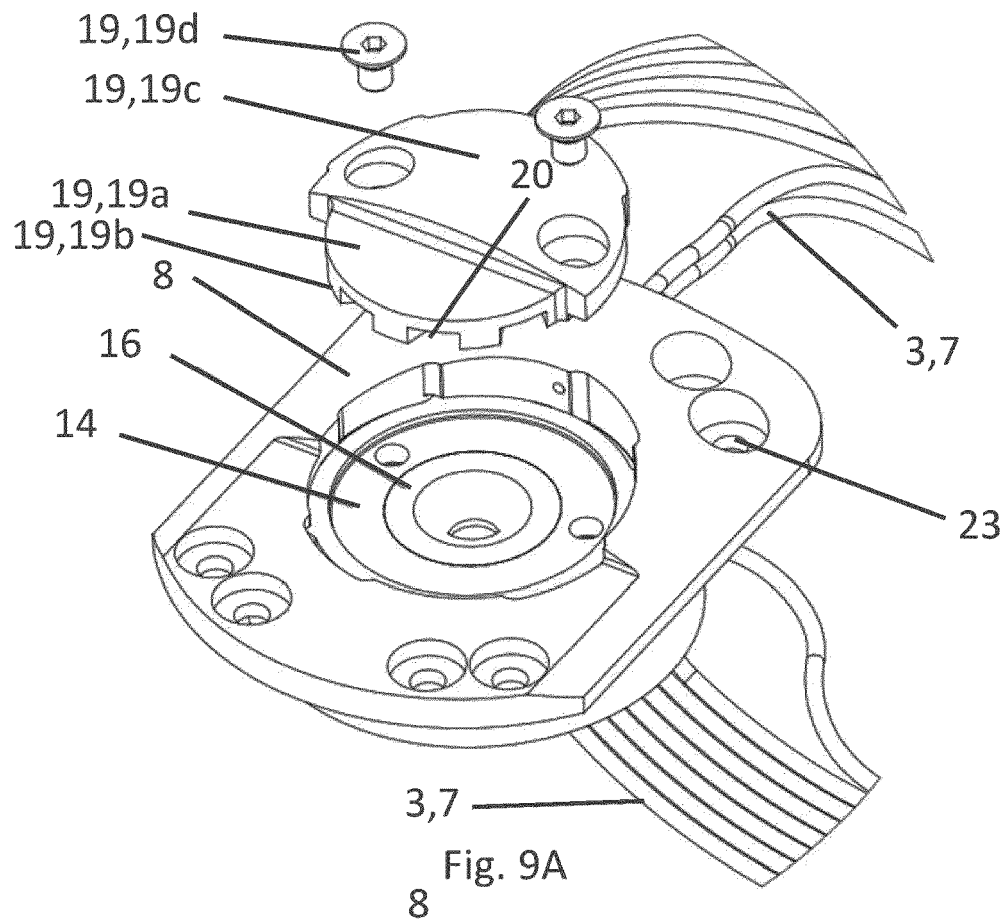
FIGS. 9 A and B show a top housing of a flow control device of the invention, where FIG. 9 A show the flow control device with the top housing separated and FIG. 9 B show a cross-section of the flow control device with a sectional cut along a radial plane through the top housing.
Figure 9B:
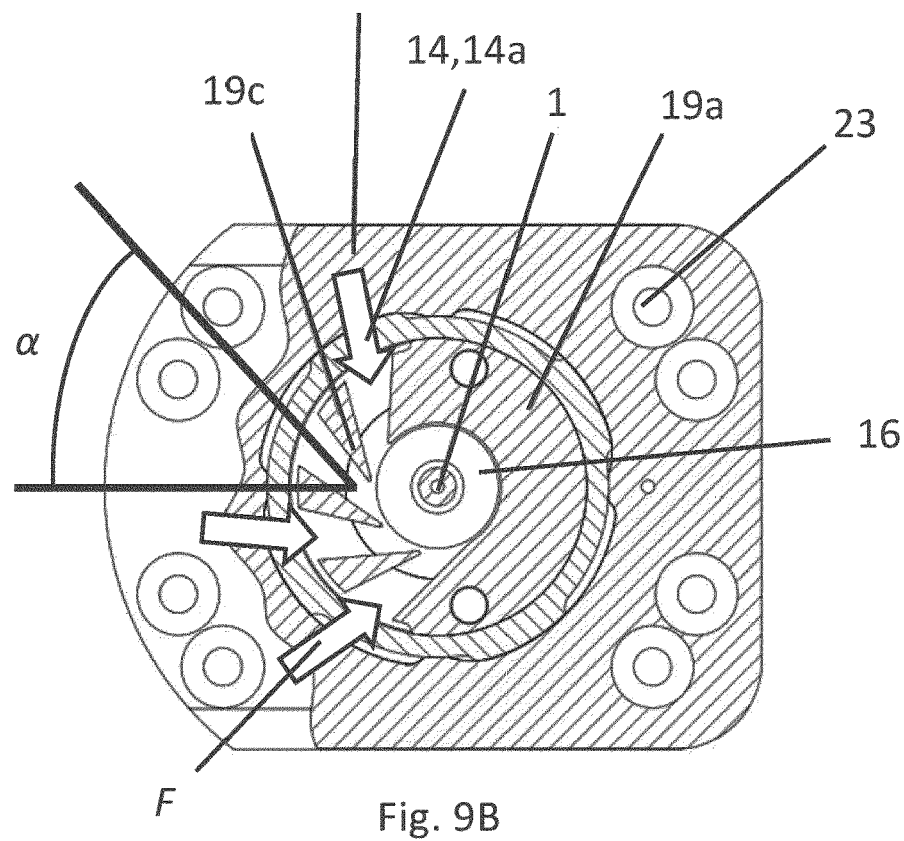

The swirl inducer 19b may be a wedge structure extruded from a disc as shown in FIG. 9B. Alternatively it may constitute a separate part fixed to the top housing 19. A swirl inducer 19b being configured with user regulatable deflection angle(s) α may also be envisaged.

Figure 8A:
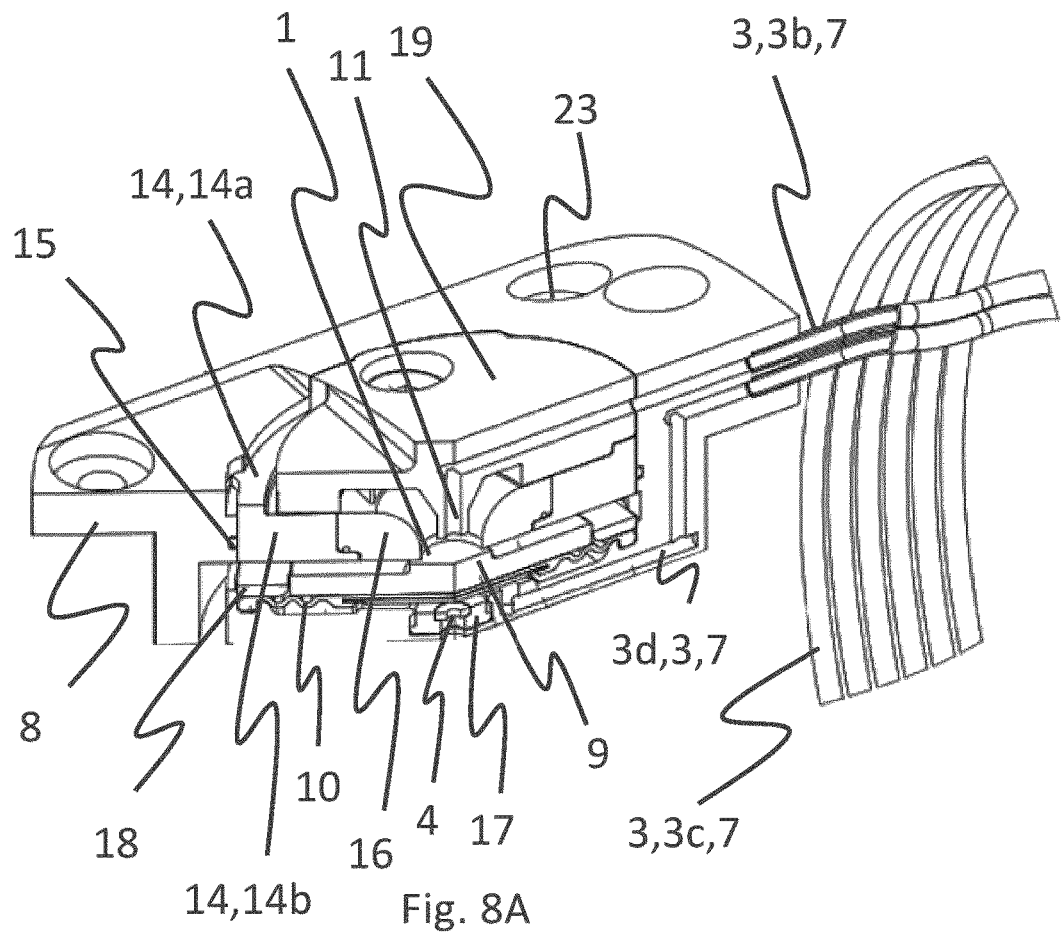
FIGS. 8 A and B show a cut-out section of the flow control device of the invention in two different perspective views.
Figure 8B:
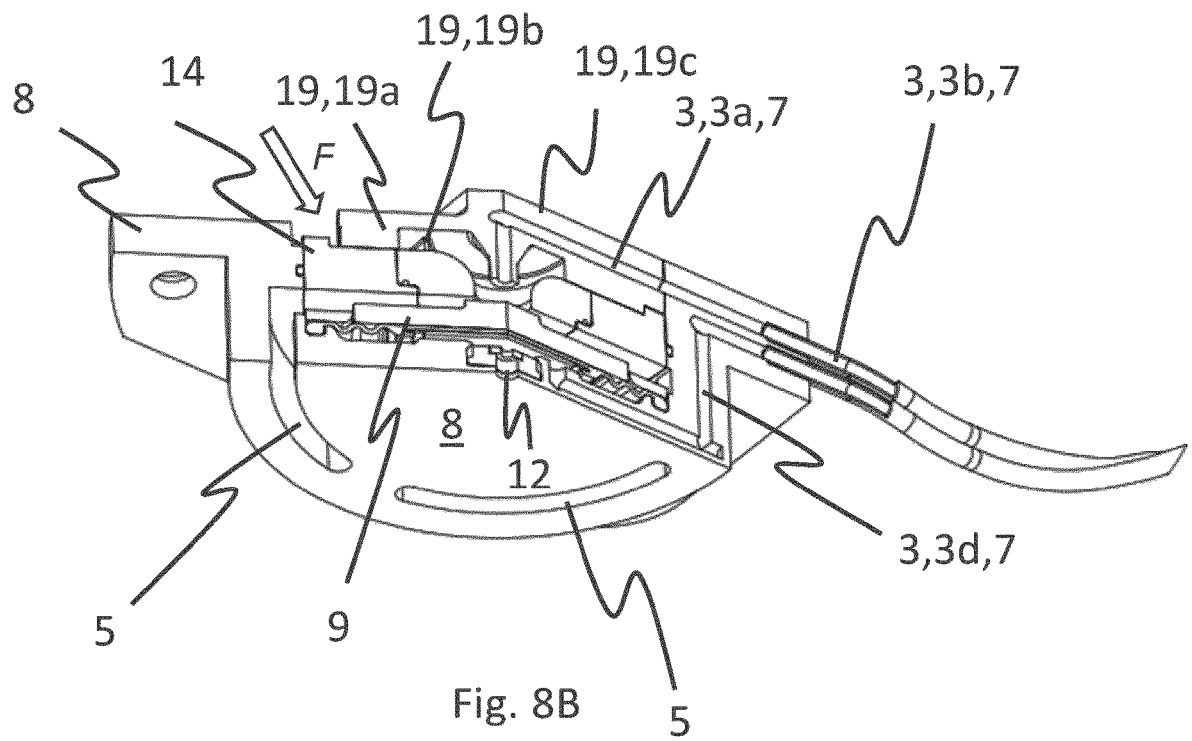

As best seen in FIG. 8, the locking ring 14 is sealed from the main housing 8 by an O-ring 15 running along the outer circumference of the locking ring's 14 lower part, i.e. beneath the part of the locking ring 14 with the locking protrusions.

The length of the interior section 3a including the secondary flow path inlet 11 within the top housing 19 is aligned with the interior section 3a within the main housing 8, thus creating the desired fluid communication. Further, the opening of the interior section 3a from the main housing 8 is set if fluid communication with the exterior straight part 3b. Consequently, the secondary fluid flow f may pass through both the top housing 19 and the main housing 8 and into the exterior straight part 3b situated outside the main housing 8. Further through the exterior coiled part 3c and back into the main housing 8 via one or more return channels 3d within the main housing 8. The return channel 3d guides the (now) laminar secondary fluid flow $f_{lam}$ via the chamber B situated beneath the piston 9 and the resilient member 10, further through a second fluid flow restrictor 4 in form of an orifice and out through the secondary flow path outlet 12 within an outlet bushing 17. The orifice 4 is arranged within an outlet bushing 17 being fixed in fluid communication with the secondary flow path outlet 12. The orifice 4 may be adjustable, thereby enabling adjustment of the degree of turbulence of the secondary fluid flow ($f_{tur}$). As explained above, the fluid characteristics of the secondary fluid flow f changes from laminar $f_{lam}$ to tubular $f_{tur}$ due to the flow through the orifice 4.

In order to fix the flow control device 100 onto the base pipe 102, the main housing 8 displays a plurality of through-going apertures 23 configured receive fixing means such as threaded screws or bolts (not shown).

In use, a fluid flow F (e.g. oil from a subterranean reservoir) is guided through a fluid flow inlet 20 into the top housing 19 enclosing an entrance volume covering at its lower side the inlet bushing 16 with the primary flow path inlet 1 and its upper side the secondary flow path inlet 11. When entered into the entrance volume, the fluid flow F is further divided into a primary fluid flow $F_0$ entering the primary flow path/primary conduit 2 through the primary flow path inlet 1 and a minor secondary fluid flow f entering the secondary flow path 7 through the secondary flow path inlet 11. The primary fluid flow $F_0$ follows the primary conduit 2 before it exits the main housing 8 through the primary flow path outlet(s) 5 and into the base pipe 102.

The remaining portion of the fluid flow F, the secondary fluid flow f, flows through the secondary conduit 7, i.e. through the secondary flow path inlet 1, the coiled pipe 3, the chamber B, the orifice 4 and finally into the base pipe 102 via the secondary flow path outlet(s) 12.

If, during oil production, water and/or gas enters the fluid flow F, causing the overall viscosity μ to drop, the resulting difference in values for $p_2$ ($\Delta P_2$, see FIG. 2) is serving to exert a pressure force against an actuating surface 6 of the piston 9 and the diaphragm 10 facing away from the inlets 1,11,20. In FIG. 6, the actuating surface 6 is shown as part of a steel insert plate vulcanized to the rubber (constituting the diaphragm 10). This particular configuration is considered beneficial to avoid plugging of the orifice 4. The change in pressure $\Delta P_2$ acting on the actuating surface 6 generates a motive force $E_2$ which serves to force the upper part 9b of the piston 9 towards the primary flow path inlet 1, thus preventing (or at least significantly limiting) further primary fluid flow $F_0$ from entering the main housing 8. The diaphragm 10 ensures a prevailing resilient force or biasing force on the piston 9 which is directed away from the primary flow path inlet 1. As a result, the piston 9 remains in an open position relative to the primary flow path inlet 1 when the primary fluid flow $F_0$ is absent or small enough not to counteract the resilient force.

Note that for all the above configurations the invention is not limited to specific material or a specific geometry. In fact, any choice of material and/or geometry is possible as long as the two fluid restrictors 3,4 in the secondary conduit 7 create a change in fluid characteristics, e.g. that one of the restrictors 3,4 creates a mainly laminar flow $f_{lam}$ and the other restrictor creates a mainly turbulent flow $f_{tur}$ during operation. Also, even if directional words such as beneath, radial and axial are used with reference to the drawings, in should be understood that these words are used only for clarity and should not be interpreted as limiting the directional position of the inventive control device 100.

All of the configurations of the inventive flow control device 100 described above are autonomous in the sense that they are activated (for closing or opening a fluid inlet) based on a changing property (e.g. viscosity μ) of the fluid F only. The coiled pipe 3, the orifice 4, the internal dimensions of the housing 8, the top housing 19 and the internally arranged bushing 18 may be designed to suit various applications.

Figure 10:
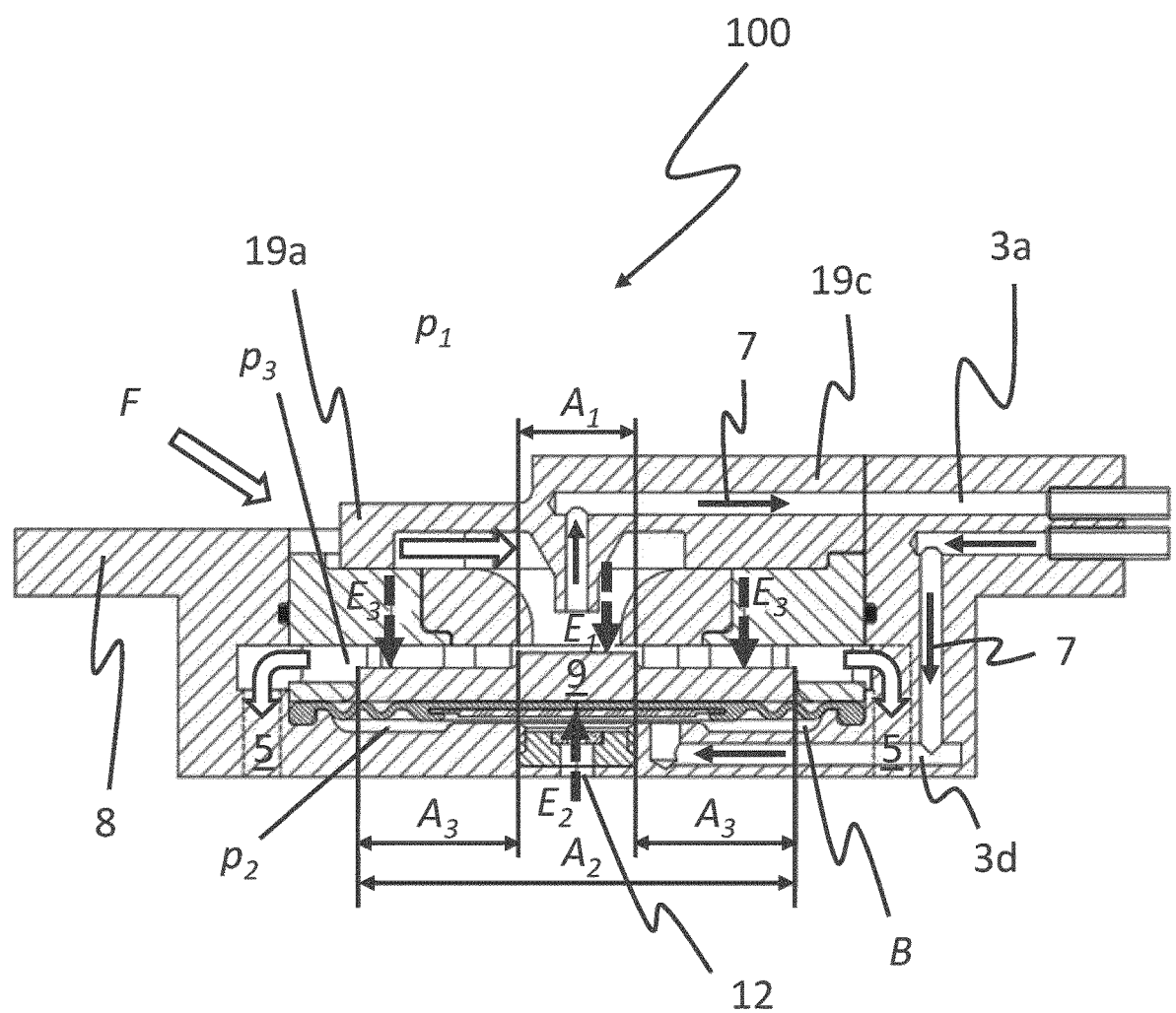
FIG. 10 shows a cross-section of a flow control device of the invention, where the direction flows, pressures, forces and affected areas involved during operation are indicated.

To better illustrate the dynamics of the inventive autonomous fluid flow control device 100, FIG. 10 shows a principal drawing of the flow control device 100 except the exterior coiled part 3c of the first fluid flow restrictor 3. The flow control device 100 is configured for stopping low viscosity fluids such as gas and water from entering the desired flow phase of high viscosity fluids such as oil. The directions of the various forces $E_1$, $E_2$, $E_3$ set up by the primary fluid flow $F_0$ are indicated, together with the corresponding pressures $p_1$, $p_2$, $p_3$ and affected cross-sectional areas $A_1$, $A_2$, $A_3$. In order for the piston 9 to stop the primary fluid flow $F_0$, the force $E_2$ ($=p_2 * A_2$) acting on the actuating surface 6 most exceed the sum of the opposing forces acting on the opposite side of the piston 9, i.e. $E_1$ ($=p_1 * A_1$)+$E_3$ ($p_3 * A_3$).

It should be understood that the fluid flow restrictors 3,4 may be arranged and configured differently. For example, the fluid flow restrictors 3,4 may be reversed in the flow path if the device is intended to be used in a gas reservoir and it is desirable to prevent higher viscosity fluid such as water from entering the production.

It should also be understood that the inventive flow control device 100 may be arranged and configured to control and prevent the inflow of other fluids, such as $CO_2$ (which has been injected into the reservoir) and steam (injected in connection with e.g. so-called Steam-Assisted Gravity Drainage (SAGD) of heavy oil), and water in gas-producing wells.

Although the invention has been described with reference to the control of well fluids (such as oil, gas, water) from a subterranean reservoir, the skilled person will understand that the invented device and its method may be useful in any application where the objective is to control fluid flow based on the properties (e.g. viscosity, density) of the various fluids in the flow to prevent unwanted fluids from entering a fluid flow. Examples of such applications are injection wells, separation processes and steam traps.

| Reference numerals: | |
|---|---|
| F | Fluid flow |
| $F_0$ | Major fraction of fluid flow/main fluid flow/primary fluid flow |
| f | Minor fraction of fluid flow/pilot fluid flow/secondary fluid flow |
| $p_1$ | First pressure |
| $p_2$ | Second pressure (between first and second fluid flow restrictors) |
| $p_3$ | Third pressure |
| $\Delta P_2$ | Pressure difference in $p_2$ generated due to change in fluid properties |
| B | Chamber |
| $t_{AICD}$ | Axial thickness of main housing 8 |
| α | Deflection angle of wedge structure 19b |
| 1 | Primary flow path inlet |
| 2 | Conduit/primary flow path/primary conduit |
| 3 | First fluid flow restrictor/coiled pipe/coiled thin tube |
| 3a | Interior section of the first fluid flow restrictor 3/interior part |
| 3b | Exterior straight part of the first fluid flow restrictor 3/exterior pipe |
| 3c | Exterior coiled part of the first fluid flow restrictor 3/exterior pipe |
| 3d | Interior return channel of the first fluid flow restrictor 3/return channel |
| 4 | Second fluid flow restrictor, orifice |
| 5 | Fluid flow outlet/primary flow path outlet |
| 6 | Actuator/actuating surface |
| 7 | Secondary flow path/secondary conduit |
| 8 | Main housing |
| 9 | Piston/valve element/movable disc |
| 9a | Lower disc of piston 9 |
| 9b | Upper disc of piston 9 |
| 10 | Hydraulic/electrical/mechanical transmission means (for transmitting pressure force)/resilient member/semi-flexible material/diaphragm |
| 11 | Secondary flow path inlet |
| 12 | Secondary flow path outlet |
| 14 | Locking ring |
| 14a | Upper part of locking ring with protrusions/locking protrusions |
| 14b | Lower part of locking ring |
| 15 | Sealing means/O-ring |
| 16 | Inlet bushing |
| 17 | Outlet bushing |
| 18 | Primary fluid flow bushing |
| 18a | Bushing teeth arranged the outer circumference of the primary fluid flow bushing 18/axial directed edge |
| 18b | Bushing openings along the outer circumference of the primary fluid flow bushing 18/opening in axial directed edge/channel opening |
| 19 | Top housing |
| 19a | First part of top housing with swirl inducers |
| 19b | Swirl inducer/wedge structure |
| 19c | Second part of top housing with secondary conduit |
| 19d | Screws for fastening top housing 19 to main housing 8 |
| 20 | Fluid flow inlet |
| 23 | Aperture for insertion of fixing mean to fix main housing 8 to base pipe 102 |
| 100 | Flow control device |
| 101 | Production string |
| 102 | Base pipe |
| 103 | Sand screen |
| 104 | First inner sleeve/enclosure |
| 105 | Inner sleeve fluid channel |
| 107 | Second inner sleeve/enclosure |
| 108 | End cap/enclosure |
| 109 | Closed input chamber |
| 110 | Outer sleeve |
| 111 | Inner sleeve opening/enclosure input opening |

The invention claimed is:

1. A fluid flow control device for establishing a controllable fluid communication of a fluid flow between an external fluid reservoir and a base pipe of a production string, comprising:
   a primary flow path arranged inside a main housing, the primary flow path comprising a primary flow path inlet configured to guide a primary fluid flow constituting a major portion of the fluid flow into the main housing during operation and a primary flow path outlet configured to guide the primary fluid flow from the main housing and into the base pipe during operation,
   a secondary flow path configured to guide a secondary fluid flow constituting the remaining portion of the fluid flow, the secondary flow path comprising a first fluid flow restrictor configured to generate a pressure decrease from a pressure $p_1$ upstream of the first fluid flow restrictor to a pressure $p_2$ downstream of the first fluid flow restrictor, a second fluid flow restrictor arranged downstream of the first fluid flow restrictor and configured to generate a pressure decrease from the pressure $p_2$ upstream of the second fluid flow restrictor to a pressure $p_3$ downstream of the second fluid flow restrictor and a chamber arranged downstream the first fluid flow restrictor and upstream the second fluid flow restrictor and
   a movable valve element arranged inside the main housing and configured to close the primary flow path for fluid flow when exposed to a pressure force from within the chamber exceeding a threshold pressure force,
   wherein the fluid flow control device further comprises:
      a top housing covering the primary flow path inlet of the main housing, the top housing comprising:
      a fluid flow inlet allowing the fluid flow to flow from the external fluid reservoir and at least partly into the primary flow path inlet,
      a swirl inducer inducing a swirl of the fluid flow between the fluid flow inlet and the primary flow path inlet, and
      a secondary flow path inlet configured to guide a secondary fluid flow into the secondary flow path.

2. The fluid flow control device in accordance with claim 1, wherein the top housing further comprises:
   at least a part of the secondary flow path arranged in fluid communication with the secondary flow path inlet.

3. The fluid flow control device in accordance with claim 1, wherein the secondary flow path inlet is into a part of the top housing facing towards the primary flow path inlet.

4. The fluid flow control device in accordance with claim 1, wherein the secondary flow path inlet is configured such that the secondary fluid flow is, during operation, flowing into the secondary flow path inlet with a direction opposite of the direction of the primary fluid flow.

5. The fluid flow control device in accordance with claim 1, wherein the swirl inducer comprises:
   a plurality of fluid flow deflectors mutually spaced apart to form at least one swirl inducing channel having a deflection angle relative to a radial direction of the fluid flow control device, setting the direction of the swirl of the fluid flow.

6. The fluid flow control device in accordance with claim 5, wherein each of the plurality of fluid flow deflectors has a wedge shape with two tapering sides oriented in the direction of the swirl.

7. The fluid flow control device in accordance with claim 1, wherein the top housing is divided into:
   a first radial part comprising:
      the fluid flow inlet, and
      the swirl inducer, and
   a second radial part comprising:
      the secondary flow path inlet, and
      at least part of the secondary flow path in fluid communication with the secondary flow path inlet.

8. The fluid flow control device in accordance with claim 7, wherein the second radial part further comprises at least part of the primary flow path inlet.

9. The fluid flow control device in accordance with claim 7, wherein the second radial part is thicker relative to the first radial part, and wherein the at least part of the secondary flow path is oriented in the radial direction at an axial height equal to or above an axial height of the fluid flow inlet.

10. The fluid flow control device in accordance with claim 7, wherein the radial boundary between the first radial part and the second radial part comprises axial walls having a deflection angle relative to a radial direction of the fluid flow control device, setting the direction of the swirl of the fluid flow.

11. The fluid flow control device in accordance with claim 1, wherein a major portion of the length of the secondary flow path extends outside the main housing.

12. The fluid flow control device in accordance with claim 1, wherein the secondary flow path inlet is positioned at a center of the swirl when in operation.

13. The fluid flow control device in accordance with claim 12, wherein both the primary flow path inlet and the secondary flow path inlet are positioned at the center of the swirl, with the secondary flow path inlet arranged at an axial height above an axial height of the primary flow path inlet.

14. A production string for transport of hydrocarbons, wherein the production string comprises:
   a base pipe,
   an enclosure arranged at the exterior wall of the base pipe having at least one enclosure input opening, and
   a fluid flow control device for establishing a controllable fluid communication of a fluid flow between an external fluid reservoir and the base pipe, comprising:
      a primary flow path arranged inside a main housing, the primary flow path comprising a primary flow path inlet configured to guide a primary fluid flow constituting a major portion of the fluid flow into the main housing during operation and a primary flow path outlet configured to guide the primary fluid flow from the main housing and into the base pipe during operation,
      a secondary flow path configured to guide a secondary fluid flow constituting the remaining portion of the fluid flow, the secondary flow path comprising a first fluid flow restrictor configured to generate a pressure decrease from a pressure $p_1$ upstream of the first fluid flow restrictor to a pressure $p_2$ downstream of the first fluid flow restrictor, a second fluid flow restrictor arranged downstream of the first fluid flow restrictor and configured to generate a pressure decrease from the pressure $p_2$ upstream of the second fluid flow restrictor to a pressure $p_3$ downstream of the second fluid flow restrictor and a chamber arranged downstream the first fluid flow restrictor and upstream the second fluid flow restrictor and
      a movable valve element arranged inside the main housing and configured to close the primary flow path for fluid flow when exposed to a pressure force from within the chamber exceeding a threshold pressure force, wherein the fluid flow control device further comprises:
- a top housing covering the primary flow path inlet of the main housing, the top housing comprising:
- a fluid flow inlet allowing the fluid flow to flow from the external fluid reservoir and at least partly into the primary flow path inlet,
- a swirl inducer inducing a swirl of the fluid flow between the fluid flow inlet and the primary flow path inlet, and
- a secondary flow path inlet configured to guide a secondary fluid flow into the secondary flow path, wherein the fluid flow control device is arranged into a through-going hole of the wall of the base pipe within the enclosure such that a controllable fluid communication is obtained between the enclosure and the interior of the base pipe, and wherein the enclosure is configured to provide an input chamber covering the at least one enclosure input opening of the enclosure and the fluid flow inlet of the fluid flow control device.

15. A method of controlling fluid flow based on changes in fluid properties using a fluid flow control device for establishing a controllable fluid communication of a fluid flow between an external fluid reservoir and a base pipe of a production string, comprising:
- a primary flow path arranged inside a main housing, the primary flow path comprising a primary flow path inlet configured to guide a primary fluid flow constituting a major portion of the fluid flow into the main housing during operation and a primary flow path outlet configured to guide the primary fluid flow from the main housing and into the base pipe during operation,
- a secondary flow path configured to guide a secondary fluid flow constituting the remaining portion of the fluid flow, the secondary flow path comprising a first fluid flow restrictor configured to generate a pressure decrease from a pressure $p_1$ upstream of the first fluid flow restrictor to a pressure $p_2$ downstream of the first fluid flow restrictor, a second fluid flow restrictor arranged downstream of the first fluid flow restrictor and configured to generate a pressure decrease from the pressure $p_2$ upstream of the second fluid flow restrictor to a pressure $p_3$ downstream of the second fluid flow restrictor and a chamber arranged downstream the first fluid flow restrictor and upstream the second fluid flow restrictor and
- a movable valve element arranged inside the main housing and configured to close the primary flow path for fluid flow when exposed to a pressure force from within the chamber exceeding a threshold pressure force, wherein the fluid flow control device further comprises:
- a top housing covering the primary flow path inlet of the main housing, the top housing comprising:
- a fluid flow inlet allowing the fluid flow to flow from the external fluid reservoir and at least partly into the primary flow path inlet,
- a swirl inducer inducing a swirl of the fluid flow between the fluid flow inlet and the primary flow path inlet, and
- a secondary flow path inlet configured to guide a secondary fluid flow into the secondary flow path, the method comprising:
  - guiding the fluid flow into the fluid flow inlet,
  - guiding the fluid flow through the swirl inducer arranged between the fluid flow inlet and the primary flow path inlet to generate a swirl of the fluid flow around the primary flow path inlet,
  - guiding the primary fluid flow constituting a major portion of the fluid flow through the primary flow path inlet within the fluid control device housing while the fluid flow is swirling; and
  - guiding the secondary fluid flow through the secondary flow path, the secondary fluid flow constituting a minor portion of the fluid flow.

* * * * *